Oct. 16, 1956 H. J. HORN 2,767,027
SIMULATED WIRE WHEEL
Filed June 9, 1953

INVENTOR.
HARRY J. HORN
BY
Barnes, Kisselle, Laughlin & Raisch
ATTORNEYS.

2,767,027

SIMULATED WIRE WHEEL

Harry J. Horn, Lansing, Mich., assignor to Motor Wheel Corporation, Lansing, Mich., a corporation of Michigan Application June 9, 1953, Serial No. 360,556

11 Claims. (Cl. 301—37)

This invention relates to a device adapted to be secured to the disc type wheel in general use on automobiles in order to give the wheel the appearance of having wire spoked construction.

The object of this invention is to provide an economically constructed device which can be easily but securely mounted on a disc type wheel to simulate the appearance of a wire spoked wheel. The device may be incorporated into the structure of disc type wheels during the course of their manufacture or may be added as an accessory to disc wheels already in use. The device preferably comprises two generally annular shaped wire spoke units and a retainer member. The wire spoke units are positioned over the obverse face of the body of the wheel in such a way as to simulate wire spokes and are compressively held in position between the rim of the wheel and a retainer member which is secured to the bolting on flange or central portion of the wheel. Various forms of the invention are shown in the following drawings:

Figure 1:
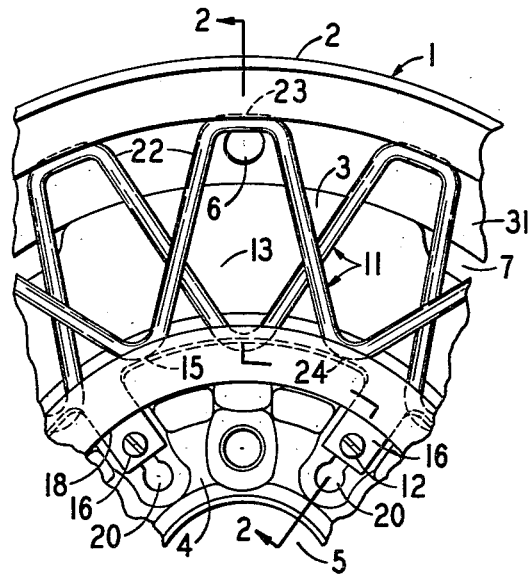
Fig. 1 is an elevational view of a portion of a wheel with a retainer member and spoke units of this invention mounted thereon.
Figure 2:
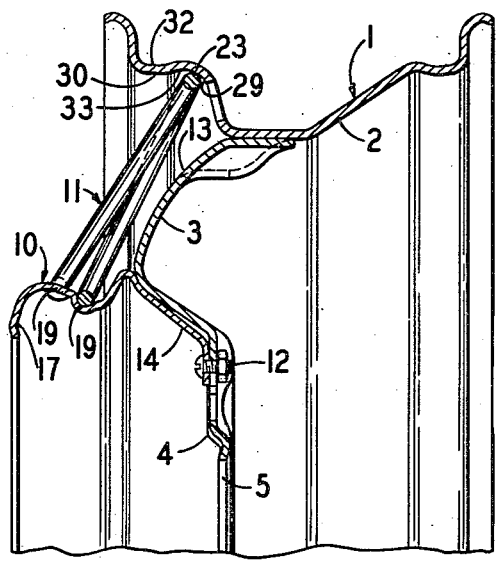
Fig. 2 is a sectional view taken on line 2—2 of Fig. 1.

A disc type wheel having a drop center rim, of the type in general use on automobiles, is shown generally at 1. The wheel has a rim 2 and a body 3. The central portion of the body 3 is shaped to form a bolting on flange 4. The bolting on flange has a centrally located aperture 5 through which an axle of an automobile vehicle may extend. The rim 2 has the usual aperture 6 through which a valve stem may extend and the body 3 has the usual openings 7 for simulating a heavy spoked construction. The invention includes a ring shaped retainer member 10 and one or more wire spoke units 11. The retainer member 10 is secured to the bolting on flange 4 by suitable means such as by bolts 12 and extends axially outward of the obverse face 13 of the body 3 of the wheel.

The axially inward end portion 14 of the retainer member 10 is shaped to fit the bolting on flange 4 and portions of the body 3 of the wheel adjacent thereto. The inner edge 15 is generally annular and extending radially inward therefrom at circumferentially spaced locations are a plurality of attachment tabs 16 which are apertured to accommodate the bolts 12. The axially outward end portion 17 of the retainer member is curved radially inward and the edge 18 thereof describes a centrally located circular opening which in use is closed by a hub cap (not shown). The portion intermediate the end portions 14 and 17 of the retainer member has a smaller diameter than the end portions and has two circumferentially extending axially spaced groups of depressions or sockets 19 therein. The sockets in the two groups are circumferentially offset for a purpose which will later appear.

The bolting on flange 4 has apertures 20 positioned for alignment with the apertures in the tabs 16 and adapted to accommodate the bolts 12. The apertures 20 and the apertures in the tabs 16 are positioned radially inwardly of the edges 18 of the retainer member and thus are readily accessible to facilitate the securing and removal of the bolts 12.

Figure 3:
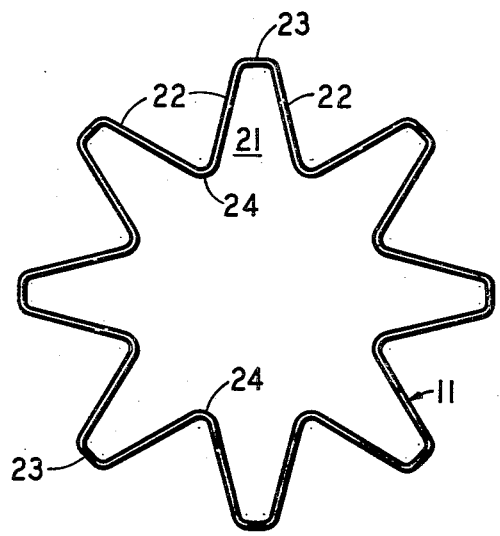
Fig. 3 is a view showing a wire spoke unit removed from the wheel.

Each wire spoke unit 11 is made of wire having the visible characteristics of the spokes to be simulated. Each spoke unit has a number of circumferentially arranged and radially extending loops or undulations 21 and preferably has a continuous structure as shown in Fig. 3. Each loop has straight side members or legs 22 and has a tapered shape, being narrowest at its radially outward end portion 23. The legs 22 of adjacent loops adjoin and the radially innermost points 24 of the junctures all lie substantially on a circle which has a diameter substantially equal to the inner diameter of the interrupted circles defined by the sockets 19 in the retainer member 10.

In assembling the parts the inner portions 24 of two spoke units 11 are snapped over an end portion of the retainer member 10 and seated in the sockets 19, one spoke unit engaging one group of sockets and the other spoke unit engaging the other group of sockets. The end portions 23 are placed in engagement with a groove-like conformation 29 in the rim 2 of the wheel which is defined by the juncture of the axially extending portion 30 which supports the bead of a tire and a generally radially extending portion 31 containing the valve stem opening 6. The retainer member 10 is then secured to the wheel by inserting bolts 12 through the aligned apertures in the tabs 16 and apertures 20 in the bolting on flange.

Since the two groups of sockets 19 are axially spaced and circumferentially offset, the positions of corresponding portions of the two spoke units will be staggered and the leg portions 22 which extend generally from the hub portion of the wheel to the rim portion will lie in crossed relation, thereby presenting the appearance of wire spokes. By this means the disc wheel is given the appearance of having wire spoked construction. It will be seen from Fig. 1 that the spoke units are positioned so that they will not obstruct the valve stem opening 6.

The over-all radial dimension of the loops 21 in the unstressed condition of the spoke units 11 is slightly greater than the distance between the sockets 19 and the rim 2 when the retainer member is tightly secured to the wheel. Therefore while the spoke units are still in unstressed condition, that is, before the bolts 12 have been tightened down, the retainer member 10 will be spaced from the body 3 of the wheel. When the bolts 12 are tightened, the retainer member 10 and the portions 24 of the spoke unit are drawn axially inwardly toward the body 3 of the wheel. This action rotates each spoke unit about its point of contact with the rim 2 thereby placing the spoke units under compression.

The ends 23 and 24 being compressively secured between the groove 29 and the sockets 19, the spoke units are virtually permanently secured to the wheel. In this regard, there is a circumferential groove 32 in the rim in which the bead of a tire seats and this results in a hump 33 in the rim axially outwardly adjacent the groove 29. This hump effectively prevents the ends 23 from slipping out of the groove 29. When a spoke unit is secured to the wheel its radially inner portions 23 are positioned axially outwardly from the end portions 23 which engage the rim of the wheel; the spoke unit thus describes a truncated cone with the outer end portions 23 lying in the base plane of the cone.

Each of the wire spoke units 11 shown in the drawings has eight loops 21 and is made of a piece of wire with its ends welded together. However, the units 11 may have any desired or convenient number of loops and the ends of the wire may be left unwelded; in such a case the ends of the wire should abut at a point within an end portion 23 of the loop or within a juncture 24. The spoke units 11 may be secured together as by welding to form a single unit if desired. Further, the spoke units and the retainer member 10 may be welded together and both may be welded to the wheel structure if desired. While it is convenient to use two wire spoke units as disclosed herein, the invention also contemplates the use of merely one spoke unit or of three or more spoke units to simulate wire spoked construction.

Figure 4:
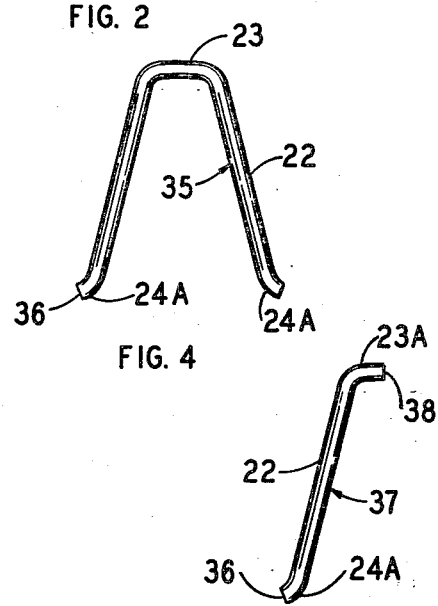
Fig. 4 shows a modified form of a spoke unit.

In a modified form of the invention the spoke units 11 are made by securing together a number of separate wire loops 35 (Fig. 4) which are shaped preferably identically to the loops 21, having the legs 22 and an end portion 23. The radially inner end of each leg 22 is bent as shown at 24a to substantially the shape of one half of the return-bent portions 24 of the spoke unit 11 and has an end face 36. Adjacent loops 35 are preferably secured together by welding their end faces 36 into abutted relation.

Figure 5:
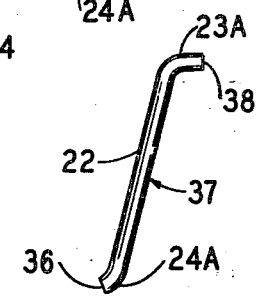
Fig. 5 shows another modification of the spoke unit.

In another modified form of the invention the spoke units 11 are made by securing together a number of separate wire half loops 37 (Fig. 5) which are shaped preferably identically to a half of the loop 35. Each half loop has a leg 22, a bent portion 24a, with an end face 36 at its radially inner end and an end portion 23a at its radially outer end constituting substantially a half of the end portion 23 of the loops 35 and 21. The end portion 23a has an end face 38. Adjacent half loops are preferably secured together by welding their respective end faces 36 and end faces 38 into abutted relation.

I claim:

1. A simulated spoke unit adapted to be mounted on a vehicle wheel of the type having a body portion and a rim portion to simulate a wire-spoked wheel comprising, an annular retainer member adapted to be mounted on the outer face of the wheel at the central portion of the wheel body and at least one annular wire member on said retainer member, said wire member comprising a plurality of generally radially extending and circumferentially arranged loops, each loop having a pair of legs converging in a radially outward direction and connected at their outer ends, the inner end of each leg joining the inner end of a leg of an adjacent loop, said inner ends being supported on said annular retainer member and said outer ends of said legs being adapted to frictionally engage the rim portion of the wheel when the annular retainer member is mounted on the outer face of the wheel at the central portion of the wheel body, said wire member being resilient in a direction normal to the plane thereof and being cone shaped with the outer ends of said legs defining the base of the cone when the unit is mounted on the wheel.

2. In combination, a vehicle wheel having a rim portion and a body portion, and a unit mounted on said wheel to simulate a wire-spoked wheel, said unit comprising, an annular retainer member mounted on the outer face of the wheel at the central portion of the wheel body, said annular retainer member being provided with two axially spaced groups of circumferentially arranged socket means, said groups being circumferentially offset, and two wire spoke members, each spoke member being formed into a generally annular shape with an undulating contour in the plane of the member and with generally straight radially extending leg portions, each undulation having a generally radially inward return-bent portion and joining adjacent undulations in generally radially outward return-bent portions, said undulations being of such radial extent that the spoke member may be mounted on the wheel by engaging the first mentioned return-bent portions with the rim portion of the wheel and by seating the second mentioned return-bent portions of each wire spoke member in one of said groups of socket means whereby said wire spoke members are arranged in overlying relation with their respective leg portions in crossed relation.

3. The combination set forth in claim 2 wherein said spoke members cooperate to define a truncated cone with said outer ends lying in the base plane of the cone.

4. The combination set forth in claim 2 wherein said rim portion of the wheel is provided with a groove in which the outer ends of said spoke members are engaged.

5. A spoke unit adapted to be mounted on a vehicle wheel of the type having a body portion and a rim portion to simulate a wire spoked wheel comprising, an annular retainer member adapted to be mounted on the outer face of the wheel at the central portion of the wheel body, and two annular wire members on said retainer member, each wire member comprising a plurality of generally radially extending and circumferentially arranged loops, each loop having a pair of legs converging in a radially outward direction and connected at their outer ends, the inner end of each leg joining the inner end of a leg of an adjacent loop, said inner ends being supported on said annular retainer member and said outer ends of said legs being adapted to engage the rim portion of the wheel when the annular retainer member is mounted on the outer face of the wheel at the central portion of the wheel body, said wire members being arranged on said retainer member in overlying relation with the legs on one wire member crossing the legs on the other wire member.

6. A spoke unit adapted to be mounted on a vehicle wheel of the type having a body portion and a rim portion to simulate a wire-spoked wheel comprising, an annular retainer member adapted to be mounted on the outer face of the wheel at the central portion of the wheel body and at least one annular wire member on said retainer member, said retainer member being provided with circumferentially arranged socket means, said wire member comprising a plurality of generally radially extending and circumferentially arranged loops, each loop having a pair of legs converging in a radially outward direction and connected at their outer ends, the inner end of each leg joining the inner end of a leg of an adjacent loop, said inner ends being arranged to seat in said socket means on said annular retainer member and said outer ends being adapted to engage the rim portion of the wheel for resiliently supporting said wire member when the annular retainer member is mounted on the outer face of the wheel at the central portion of the wheel body.

7. A spoke unit adapted to be mounted on a vehicle wheel of the type having a body portion and a rim portion to simulate a wire-spoked wheel comprising, an annular retainer member adapted to be mounted on the outer face of the wheel at the central portion of the wheel body and two annular wire members on said retainer member, said retainer member being provided with two axially spaced groups of circumferentially arranged socket means, said groups being circumferentially offset, each wire member comprising a plurality of generally radially extending and circumferentially arranged loops, each loop having a pair of legs converging in a radially outward direction and connected at their outer ends, the inner end of each leg joining the inner end of a leg of an adjacent loop, the inner ends of each wire member being arranged to be seated in one of said groups of socket means, whereby said wire members are arranged in overlying relation with the legs of one wire member crossing the legs of the other wire member, said outer ends of said legs being adapted to engage the rim portion of the wheel when the annular retainer member is mounted on the outer face of the wheel at the central portion of the wheel body.

8. A spoke unit adapted to be mounted on a vehicle wheel of the type having a body portion and a rim portion to simulate a wire-spoked wheel comprising, an annular retainer member adapted to be mounted on the outer face of the wheel at the central portion of the wheel body and two annular wire members on said retainer member, said retainer member being provided with two axially spaced groups of circumferentially arranged socket means, said groups being circumferentially offset by a distance substantially equal to one half the circumferential extent of one loop, each wire member comprising a plurality of generally radially extending and circumferentially arranged loops, each loop having a pair of legs converging in a radially outward direction and connected at their outer ends, the inner end of each leg joining the inner end of a leg of an adjacent loop, the inner ends of each wire member being arranged to be seated in one of said groups of socket means, whereby said wire members are arranged in overlying relation with the legs of one wire member crossing the legs of the other wire member, said outer ends of said legs being adapted to engage the rim portion of the wheel when the annular retainer member is mounted on the outer face of the wheel at the central portion of the wheel body.

9. In combination, a vehicle wheel having a rim portion and a body portion, said body portion having adjacent the center thereof a retainer portion provided with two axially spaced groups of circumferentially arranged socket means, said groups being circumferentially offset, and two wire spoke members, each spoke member being formed into a generally annular shape with an undulating contour in the plane of the member and with generally straight radially extending leg portions, each undulation having a generally radially inward return-bent portion and joining adjacent undulations in generally radially outward return-bent portions, said undulations being of such radial extent that the spoke member may be mounted on the wheel by engaging the first mentioned return-bent portions with the rim portion of the wheel and by seating the second mentioned return-bent portions of each wire spoke member in one of said groups of socket means, whereby said wire spoke members are arranged in overlying relation with their respective leg portions in crossed relation.

10. A simulated spoke unit adapted to be mounted on a vehicle wheel of the type having a body portion and a rim portion to simulate a wire spoked wheel comprising, a retainer member adapted to be mounted on the outer face of the wheel at the central portion of the wheel body, at least one wire member formed into a generally annular shape with an undulating contour in the plane of the member, each undulation having a generally radially inward return bent portion and joining adjacent undulations in generally radially outward return bent portions, said member having an open center defined generally by said outward return bent portions, said outward return bent portions being adapted to seat on said retainer member, said open center having a smaller diameter than the maximum diameter of said retainer member, said outward return bent portions being circumferentially resilient for radially expanding said open center to facilitate seating said outward return bent portions on said retainer member, said inward return bent portions being adapted to seat on the rim of a wheel, said undulations having such radial extent that said inward return bent portions seat against the rim of a wheel on which said unit is adapted to be used when said outward return bent portions are seated on said retainer member, whereby to detachably mount said unit axially outwardly of the wheel body.

11. The structure defined in claim 10 wherein said retainer member and said open center have annular form, said wire member being flexible in a direction normal to the plane thereof for radially expanding said open center, and so that said wire member assumes generally conical form when mounted on the wheel.

References Cited in the file of this patent

UNITED STATES PATENTS

| | | |
|---|---|---|
| 1,612,145 | Nelson | Dec. 28, 1926 |
| 1,630,226 | Swain | May 24, 1927 |
| 1,795,574 | Olson | Mar. 10, 1931 |
| 1,973,183 | Tarbox | Sept. 11, 1934 |

FOREIGN PATENTS

| | | |
|---|---|---|
| 714,587 | France | Nov. 17, 1931 |
| 785,131 | France | Aug. 2, 1935 |